United States Patent [19]
Haddad et al.

[11] Patent Number: 5,804,806
[45] Date of Patent: Sep. 8, 1998

[54] DEVICE AND METHOD FOR PROCESSING CODED INFORMATION FOR BARCODE AND CHIP CARD

[75] Inventors: Aneace Haddad, Les Arcs sur Argens; Bernard Chevalier, Marseilles, both of France

[73] Assignee: Marketlink, Aix-en-Provence, France

[21] Appl. No.: 625,340

[22] Filed: Apr. 1, 1996

[30] Foreign Application Priority Data

Apr. 7, 1995 [FR] France ................................. 95 04162

[51] Int. Cl.⁶ .......................... G06K 15/00; G06F 17/60
[52] U.S. Cl. ................................... 235/383; 235/385
[58] Field of Search ........................... 235/380, 383, 235/387, 375, 462, 472, 492, 432

[56] References Cited

U.S. PATENT DOCUMENTS

| | | | |
|---|---|---|---|
| 5,382,779 | 1/1995 | Gupta | 235/383 |
| 5,448,046 | 9/1995 | Swartz | 235/432 |

FOREIGN PATENT DOCUMENTS

| | | | |
|---|---|---|---|
| 404070993A | 3/1992 | Japan | 235/380 |
| 406096293A | 4/1994 | Japan | 235/380 |

Primary Examiner—Donald T. Hajec
Assistant Examiner—Thien Minh Le
Attorney, Agent, or Firm—Merchant, Gould, Smith, Edell, Welter & Schmidt, P.A.

[57] ABSTRACT

A device and a method for processing coded information, including reading coded data from a chip card, reading a barcode reproduced on an item, and comparing the information read and information stored relating to a series of prespecified items. It also includes processing the results of these comparisons and writing, to the memory of the chip card, information arising on the one hand from the results of these comparisons and on the other hand from the date of purchase. Reading data from and writing information to the chip card is provided in respect of at least two different types of chip cards and includes identification of specific particulars and of acceptance or rejection of the chip cards on the basis of the specific particulars.

9 Claims, 1 Drawing Sheet

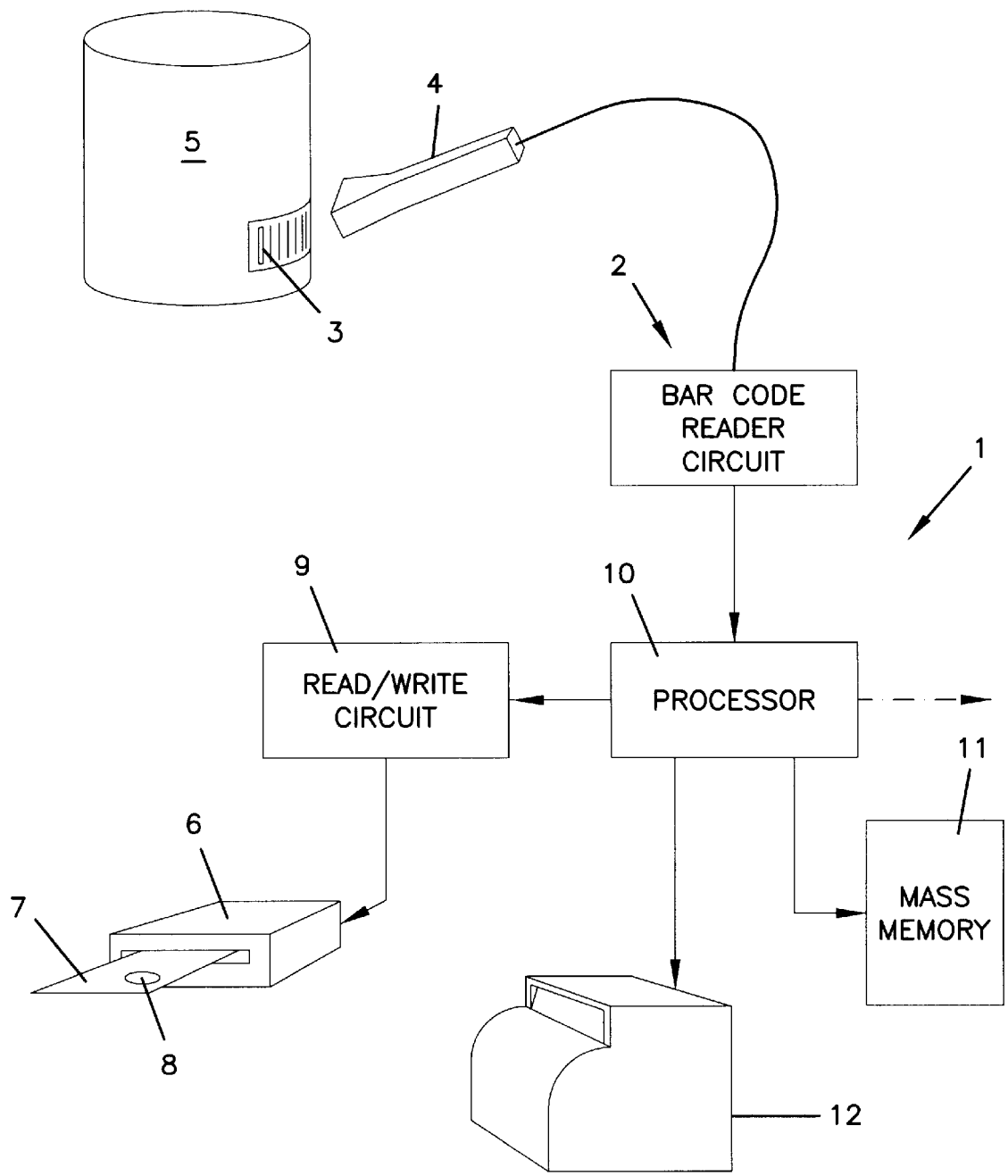

DEVICE AND METHOD FOR PROCESSING
CODED INFORMATION FOR BARCODE
AND CHIP CARD

FIELD OF THE INVENTION

The present invention relates to a device for processing coded information, when purchasing an item from a retail outlet, of the type which comprises means for reading coded data from a chip card, means for reading a barcode reproduced on the item, means of storage of coded information relating to one or more items, means for comparing the information read by the barcode reader means and information stored in the said means of storage and relating to a series of prespecified items, means for processing the results of these comparisons, and means configured so as to print an invoice automatically and which are controlled by the said means for processing the results.

It also relates to a method implementing such a device.

The present invention finds a particularly important though non-exclusive application in the field of the processing of loyalty cards, presented at the time of payment by the customers of retail outlets, such as hypermarkets and supermarkets.

DESCRIPTION OF THE PRIOR ART

Systems for processing such cards are already known. These require the installation of a separate and tailored device for each card processed, and for each model and brand of cash till processing the card. Such systems therefore have drawbacks. They give rise in fact to inflexible applications which are difficult to modify and preclude standardized operation.

Such devices developed in particular in the banking sector are also known, which operate with chip cards. This type of device is of limited scope and, in particular, does not allow modification of the contents of the card on the basis of the information arising from the barcode reader.

The present invention aims to provide a device and method which are superior to those previously known in meeting the demands of practice, particularly in that it is easily adaptable to the existing protocols and equipment, in that it allows uniform management of an environment composed of different barcode readers and chip card readers, while implementing simple algorithms.

SUMMARY OF THE INVENTION

For this purpose, the invention proposes in particular a device for processing coded information, when purchasing an item from a shop, of the type defined above, characterized in that it includes means for writing, to the memory of the chip card, information arising on the one hand from the results of the comparisons between the coded information of the barcode and information relating to a series of specified items, and on the other hand from the date of purchase, and in that the means for reading data from and writing information to the chip card are provided in respect of at least two different types of chip card and include means of identification of the specific particulars and of acceptance or rejection of the said chip cards on the basis of the said specific particulars.

By virtue of the invention, the retail outlet's cash-till system will make it possible, when the cashier inserts the card into the chip-card reading means, to read the contents of the card, analyse the list of barcodes of the items purchased by the customer and compare them with the codified information, by applying the selection algorithm or algorithms set up through the claimed protocol.

The information thus gleaned is recorded in a specific file of the memory of the chip card, for example designated by the protocol on the basis of the physical nature of the card (the size of its memory, the type of processors, the version, etc.).

The invention thus makes it possible to standardize and simplify the processing of chip cards in a complex technical environment which includes a considerable number of dissimilar hardware peripherals and software packages as is the case in a retail outlet comprising several terminals on various customer checkout sites, each furnished with means for reading item barcodes.

Advantageous embodiments will resort moreover to one and/or other of the following provisions:

the device includes command means making it possible to declare the specifications of the actions to be performed on the contents of the memory of the chip card following the reading of the barcode;

the command means making it possible to declare the specifications of the actions to be performed are configured so as to check the validity of the command within the context of the purchase just made;

the command means making it possible to declare the specifications of the actions to be performed are configured so as to add extra information to the memory of the chip card on the basis of the absence of one or more items from the purchase just made;

the command means making it possible to declare the specifications of the actions to be performed are configured so as to make it possible to add information to the memories of any card presented whose specific particulars are accepted.

The invention also proposes a method of processing coded information, when purchasing an item from a retail outlet, according to which coded data are read from a chip card, a barcode reproduced on the item purchased is read, the information read is compared with information stored in storage means and relating to series of prespecified items to be purchased, the results of these comparisons are processed in order to print an invoice automatically, and an invoice is printed automatically on the basis of the said results, characterized in that information arising on the one hand from the results of these comparisons and on the other hand from the date of purchase is written to the memory of the chip card, and in that the data is read from and the information is written to the chip card for at least two different types of chip card, after identification of the specific particulars and acceptance or rejection of the said chip cards on the basis of the said specific particulars.

Advantageously, when processing the said coded information, the specifications of the actions to be performed on the contents of the memory of the chip card following the reading of the barcode are declared.

In an advantageous embodiment, the specifications of the actions to be performed are declared, and extra information is added to the contents of the memory of the chip card on the basis of the absence of one or more items from the purchase just made.

Also advantageously, the specifications of the actions to be performed are declared and extra information is added to the memories of any card presented whose specific particulars are accepted.

The invention will be better understood on reading the description which follows of a particular embodiment given by way of non-limiting example.

BRIEF DESCRIPTION OF THE DRAWING

The description refers to the drawing which accompanies it in which the single figure shows a general diagram of a device 1 according to the embodiment of the invention more particularly described here, comprising a reader 2 for a barcode 3, for example via a light-pen 4.

The barcode 3 serves to identify an item 5 in a manner known per se.

DETAILED DESCRIPTION OF THE PREFERRED EMBODIMENT

The device 1 comprises a box 6 into which may be inserted a card 7 with a chip 8 connected to a circuit 9 for reading from/writing to the memory of the chip.

The barcode reader 2 and the read/write circuit 9 are connected to processing means 10 consisting for example of a microcomputer linked to a mass memory 11 configured so as to store data relating to a series of prespecified items, and to a cash till 12 and invoice printer.

The processing means 10 are moreover connected to means (not represented) which are located wholly remote from the site on which the device 1 is installed and are configured so as to ensure the consistency of the information processed and collected by various devices and to effect compensation between the data coming from the various sites.

More precisely, the invention implements a protocol made up of a method for codifying commands, and algorithms initiated by inserting the chip card 7 into the box 6.

These algorithms execute the commands on the basis of the information coming from the barcode reader 2 and from the read/write circuit 9, of the memory of the card.

The algorithms mentioned above will be given more precisely below.

The general syntax of the protocol, used in the embodiment of the invention more particularly described here, begins with a command (a reserved word) followed by a list of parameters separated, for example, by semicolons.

By way of example, below is presented the use of the invention in the framework of promotions management.

The CARD command makes it possible to declare the specific particulars of each chip card which is accepted by the system.

The syntax of the CARD command is for example as follows:
CARD Version;Mask;CpnsDir;CpnsFile;MaxCpns; PointsDir;PointsFile Version is the version number of the card, unique for each CARD command.

Mask is the name of the operating system of the card, which differs for each card supplier.

CpnsDir is the name of the directory, in the memory of the card, which contains the promotions file.

CpnsFile is the name of the promotions file, in the memory of the card.

MaxCpns is the maximum number of coupons which the card can contain.

PointsDir is the name of the directory which contains the points file.

PointsFile is the name of the points file.

The PROMO command makes it possible to declare the specifications of the actions to be performed on the memory of the card following the reading of a barcode.

The syntax of the PROMO command is as follows:
PROMO Version;InitSf;PromoCode;Desc1;Desc2;Amount; Start;End;MinBasket;Term [;EANCode;SfCode;Option]

Version is the version number of the cards targeted by this command.

InitSf is the sub-family code initiating the offer. This parameter designates the sub-family of items which will initiate activation of the promotion.

Note: Arbitrarily, the codes 900 and 901 require special processing. The code 900 represents a coupon distributed only to those customers who have not purchased the product on promotion. The code 901 represents a coupon distributed non-selectively to every card bearer.

PromoCode is the promotion code, unique for each promotion.

Desc1,Desc2 are the descriptions of the promotion.

Amount is the amount of the discount, in centimes, or in points.

Start is the promotion start date, from which the promotion will begin to be written on the cards.

End is the promotion end date, from which the promotion will no longer be advertised.

MinBasket is the minimum amount of the basket in francs, the threshold below which the promotion will not be activated.

Term is the length of the term of the coupon in days (0/15/30/45). If the length of the term is 0 days, points will be distributed instead of coupons.

EanCode is the EAN code of the item(s) on promotion. The EAN code may contain the letter "X" in one or more positions, the promotion will therefore be valid for several items having the same basic structure, to within one or more digits, all belonging to the sub-family indicated.

SfCode is the sub-family code of the item(s) on promotion.

Option is the maintaining-of-loyalty/new customer option. If this value is "S" (for [S]ame product), the customer will receive this discount voucher if the EAN purchased is identical to the EAN on promotion. If the value is "O" ([O]ther products), the customer will receive this discount voucher if the EAN purchased differs from the EAN on promotion. If the value is D, the option is deactivated.

The last 3 parameters (EANCode, SfCode, Option) may be omitted; in this case, the promotion pertains to an overall purchase rather than to a specific item.

Regarding the operation, for each item scanned having a sub-family, the algorithm referred to as "issue by initiation" is performed.

This algorithm searches for the PROMO commands whose InitSf value is the value of the sub-family of the item scanned, and will then check the validity of the command withwithin the context of the purchase just made:

the record must be valid on the day of the transaction, the total amount of the transaction must be greater than MinBasket, Option="D", or Option="S" and EAN scanned= EANCode or Option="O" and the first 6 characters of the EAN scanned differ from those of EANCode.

If these conditions are satisfied, the record is then added to the card.

Similarly, the algorithm referred to as "issue by omission" makes it possible to add records to a card, depending on the absence of one or more items from the purchase just made. These records are designated by PROMO commands with the parameter InitSf having the value "900".

Similarly, the algorithm referred to as "non-selective issue" makes it possible to add records to any card presented. These records are designated by PROMO commands with the parameter InitSf having the value "901".

The algorithms mentioned above are given more precisely below:

Issue-by-initiation algorithm:

```
For each item scanned having a MarketLink sub-family <>0
{
read promotions file, with Promotion.InitiatorSf=MarketLink sub-
family of the ean scanned;
while a promotion exists for this sub-family, and while
number_of_coupons_available < 15
{
if  ((Promotion.Option=1) or Promotion.Option = S and
    ean_scanned = Promotion.EANCode) or (Promotion.Option = O
    and ean-scanned [car 1 to car 6] <>Promotion.EANCode[car 1
    to car 6]))
and Promotion.Start<=today<=to Promotion.End)
and (Promotion.MinBasket<=amount_of_receipt)
and (Promotion.EANCode + Promotion.SFCode is not already within
    the "card-image" memory space)
    register the promotion into the "card-image" memory space;
    number of_of_coupons available =
    number_of_coupons_available+1;
{
  read the next promotion;
}
}
}
```

Issue-by-omission algorithm:

```
read promotions file, with Promotion.InitiatorSf = "900"
while a promotion exists for sub-family "900", and while
number_of_coupons_available < 15
{
{
if  (Promotion.Start<=today<=Promotion.End)
and (Promotion.MinBasket<=amount_of_receipt)
and (Promotion.EANCode + Prornotion.SFCode is not in the
    customer's basket)
{
    register the promotion into the "card-image" memory space;
    number _of_coupons_available =
    number_of_coupons_available+1;
}
read the next promotion;
}
```

Non-selective-issue algorithm

```
read promotions file, with Promotion.InitiatorSf = "901"
while a promotion exists for sub-family "901", and while
number_of_coupons available < 15
{
{
if  (Promotion.Start<=today<=Promotion.End)
and (Promotion.MinBasket<=amount_of_receipt)
and (Promotion.EANCode + Promotion.SFCode is not already in
    the "card-image" memory space)
    register the promotion into the "card-image" memory space;
    number _of_coupons_available =
    number_of_coupons_available+1;
}
read the next promotion;
}
```

The operation of the device 1 of FIG. 1 will now be described.

A loyalty card 7 is presented to the cashier in order to receive discount vouchers and accumulate points. When the bearer purchases an item 5 in respect of which he holds a discount voucher on his card, the value of the discount is automatically deducted from his receipt. Moreover, the bearer can choose to settle his purchase with the balance of points which he has accumulated on his card, on the basis of 1 point equals 1 franc.

The discount vouchers are issued selectively, depending on the purchases of the bearer. A promotions campaign may, for example, introduce a 5-franc discount voucher, to be set against a subsequent purchase of brand X tennis balls. Rather than extending this voucher to all bearers, the brand X will choose to allot it only to bearers buying, for example, a tennis racquet.

The points are also issued selectively. For example, a brand of shoes Y offers 50 points to the purchasers of its sports shoes.

By virtue of the invention, it becomes possible to manage this selectivity. The cash-till system receives the characteristics of the promotions and incorporates them into each till. A given promotion will be initiated when an EAN initiator code is read by the scanner of the till.

The environment thus comprises functions which incorporate the algorithms of the invention which can be used directly by a cash-till system programmed, for example, in the C language.

As is self-evident and as results moreover from the above, the present invention is not limited to the embodiment more particularly described but embraces all variants thereof.

We claim:

1. Device for processing coded information, when purchasing an item from a retail outlet, comprising.
    means for reading coded data from a chip card;
    means for reading a barcode reproduced on the item;
    means of storage of coded information relating to one or more items;
    means for comparing the information read by the barcode reader means and information stored in said means of storage and relating to a series of prespecified items;
    means for processing the results of these comparisons;
    and means configured so as to print an invoice automatically and which are controlled by the said means for processing the said results, wherein it includes means for writing a discount voucher or electronic image of the printed invoice to a memory of the chip card, information arising on the one hand from the results of these comparisons and on the other hand from date of purchase and
    wherein the means for reading data from and writing information to the chip card are provided in respect of at least two different types of chip card and include means of identification of specific particulars and of acceptance or rejection of said chip cards on the basis of said specific particulars.

2. Device according to claim 1, wherein it includes command means making it possible to declare the specifications of actions to be performed on the contents of the memory of the chip card following the reading of the barcode.

3. Device according to claim 2, wherein the command means making it possible to declare the specifications of the actions to be performed are configured so as to check validity of a command within context of the purchase just made.

4. Device according to claim 2, wherein the command means making it possible to declare the specifications of the actions to be performed are configured so as to add extra information to the memory of the chip card on the basis of the absence of one or more items from the purchase just made.

5. Device according to claim 2, wherein the command means making it possible to declare the specifications of the actions to be performed are configured so as to make it possible to add information to the memories of any card presented whose specific particulars are accepted.

6. Method of processing coded information, when purchasing an item from a retail outlet, comprising the steps of;

reading coded data from a chip card;

reading a barcode reproduced on the item purchased;

comparing the information read from the barcode with information stored in a storage means and relating to series of prespecified items to be purchased;

processing the results of these comparisons in order to print an invoice automatically; and printing an invoice automatically on the basis of said results, wherein information arising on the one hand from the results of these comparisons and on the other hand from the date of purchase is written to a memory of the chip card; and data is read from and the information is written to the chip card for at least two different types of chip card, after identification of specific particulars and acceptance or rejection of said chip cards on the basis of said specific particulars.

7. Method according to claim 6, wherein the specifications of actions to be performed on the contents of the memory of the chip card following the reading of the barcode are declared.

8. Method according to claim 6, wherein the specifications of actions to be performed are declared, and extra information is added to the contents of the memory of the chip card on the basis of the absence of one or more items from the purchase just made.

9. Method according to claim 6, wherein the specifications of the actions to be performed are declared and extra information is added to the memories of any card presented whose specific particulars are accepted.

* * * * *